US012283397B2

(12) United States Patent
Vaccaro

(10) Patent No.: US 12,283,397 B2
(45) Date of Patent: Apr. 22, 2025

(54) GROMMETS FOR HOLDING CABLES

(71) Applicant: Outdoor Wireless Networks LLC, Claremont, NC (US)

(72) Inventor: Ronald A. Vaccaro, Taylorsville, NC (US)

(73) Assignee: OUTDOOR WIRELESS NETWORKS LLC, Richardson, TX (US)

( * ) Notice: Subject to any disclaimer, the term of this patent is extended or adjusted under 35 U.S.C. 154(b) by 193 days.

(21) Appl. No.: 18/061,085

(22) Filed: Dec. 2, 2022

(65) Prior Publication Data

US 2023/0230731 A1 Jul. 20, 2023

Related U.S. Application Data

(60) Provisional application No. 63/355,787, filed on Jun. 27, 2022, provisional application No. 63/300,330, filed on Jan. 18, 2022.

(51) Int. Cl.
*H01B 17/58* (2006.01)

(52) U.S. Cl.
CPC .................................. *H01B 17/583* (2013.01)

(58) Field of Classification Search
CPC ............ H02G 3/32; H02G 3/083; H02G 3/04; H02G 7/10; H01B 17/56; H01B 17/583; H01B 3/441; F16L 3/137; F16L 3/12; G02B 6/4428; G02B 6/4471
See application file for complete search history.

(56) References Cited

U.S. PATENT DOCUMENTS 3,744,008 A * 7/1973 Castellani ............ H02G 3/0658 174/652
4,731,505 A * 3/1988 Crenshaw .......... H01B 11/1869 174/136
6,394,464 B1 5/2002 Moreau
9,306,380 B2 4/2016 Vaccaro
9,866,004 B2 1/2018 Vaccaro et al.
9,903,510 B2 2/2018 Joshi et al.
10,253,906 B2 4/2019 Vaccaro
10,830,978 B2 11/2020 Wang et al.
11,204,109 B2 12/2021 Vaccaro et al.
2005/0076469 A1 4/2005 Tisbo
2013/0099452 A1* 4/2013 Hein ........................ H05K 5/02 277/607

(Continued)

OTHER PUBLICATIONS

"International Search Report and Written Opinion of the International Searching Authority", International Application No. PCT/US2022/051628, Apr. 20, 2023, 12 pp.

*Primary Examiner* — Roshn K Varghese
(74) *Attorney, Agent, or Firm* — Myers Bigel, P.A.

(57) ABSTRACT

The present disclosure describes a grommet formed of a polymeric material and adapted for securing a cable within a cable hanger. The grommet includes a main body having a generally cylindrical profile, the main body further having a length, a thickness, and a longitudinal axis, a plurality of spokes extending radially inward from the main body at an oblique angle relative to the main body, and an annular inner wall coupled to the plurality of angled spokes and surrounding an interior cavity, wherein the annular inner wall extends the length of the main body. Other grommets and cable hanger assemblies are described herein.

18 Claims, 14 Drawing Sheets

(56) References Cited

U.S. PATENT DOCUMENTS

| | | | | |
|---|---|---|---|---|
| 2017/0108147 | A1* | 4/2017 | Cindrich .................. | H02G 3/22 |
| 2019/0179096 | A1 | 6/2019 | Vaccaro | |
| 2020/0041042 | A1 | 2/2020 | Vaccaro et al. | |
| 2020/0043637 | A1 | 2/2020 | Joshi et al. | |
| 2022/0139598 | A1 | 5/2022 | Vaccaro et al. | |

* cited by examiner

GROMMETS FOR HOLDING CABLES

RELATED APPLICATION(S)

The present application claims priority to and the benefit of U.S. Provisional Patent Application Ser. No. 63/300,330, filed Jan. 18, 2022, and U.S. Provisional Patent Application Ser. No. 63/355,787, filed Jun. 27, 2022, the disclosures of which are hereby incorporated herein in their entireties.

FIELD

The invention relates to grommets for holding cables.

BACKGROUND

Until recently, antenna towers have typically employed RF coaxial cables for power and/or signal communications. Such cables are often mounted to the tower via cable hangers, which capture the cable and mount it to the tower. One popular variety of cable hanger is a "stackable" hanger, which has the capacity to mount via snap latches to another hanger, thereby enabling multiple cables to be mounted in a "stack." An exemplary stackable hanger is the Snap-Stak hanger, available from CommScope, Inc. (Joliet, Illinois). See, e.g., U.S. Pat. No. 9,866,004 to Vaccaro et al.; U.S. Pat. No. 9,903,510 to Joshi et al.; and U.S. Pat. No. 10,253,906 to Vaccaro, the disclosures of which are incorporated herein in their entireties. Snap-in hangers are often desirable due to their ease of use, although cable hangers that are not stackable are often employed also.

Operators have begun to replace traditional RF cables on towers with fiber optic, power, and/or hybrid fiber/power cables. These new cables (especially the hybrid styles) can have a slightly irregular shape. Also, fiber optic and hybrid fiber/power cables are typically heavy (in some instances three to four times the weight per unit length of the traditional RF cable). In addition to being of a slightly irregular shape, the diameter over-jacket (DOJ) of a cable can be vastly different from traditional RF cables.

As a result, in practice some operators use standard hangers in combination with grommets to hang fiber, power, or hybrid fiber/power cables. The grommets are a fairly soft polymer (e.g., EPDM, nylon, or the like). The outer diameter of the grommet may be sized to fit in the hanger, whereas the inner diameter is configured to grip the fiber, power, or hybrid fiber/power cable. However, the grommets may be sized poorly for the cables they receive and/or may slip from the cable hanger. As such, modifications to improve the holding of cables within the cable hanger via such grommets may be desirable.

SUMMARY

A first aspect of the present invention is directed to a grommet formed of a polymeric material and adapted for securing a cable within a cable hanger. The grommet includes a main body having a generally cylindrical profile, the main body further having a length, a thickness, and a longitudinal axis, a plurality of spokes extending radially inward from the main body at an oblique angle relative to the main body, and an annular inner wall coupled to the plurality of angled spokes and surrounding an interior cavity, the annular inner wall extending the length of the main body.

Another aspect of the present invention is directed to a grommet formed of a polymeric material and adapted for securing a cable within a cable hanger. The grommet includes a main body having a generally cylindrical profile, the main body further having a length, a thickness, and a longitudinal axis, a plurality of spokes extending radially inward from the main body, and an annular inner wall coupled to the plurality of angled spokes and surrounding an interior cavity, the annular inner wall extending the length of the main body.

Another aspect of the present invention is directed to a cable hanger assembly. The assembly including a cable hanger having opposable arms and a grommet formed of a polymeric material and adapted for securing a cable within the cable hanger. The grommet includes a main body having a generally cylindrical profile, the main body further having a length, a thickness, and a longitudinal axis, a plurality of spokes extending radially inward from the main body at an oblique angle relative to the main body, and an annular inner wall coupled to the plurality of angled spokes and surrounding an interior cavity, the annular inner wall extending the length of the main body. The grommet is held between the opposable arms of the cable hanger.

Another aspect of the present invention is directed to a grommet formed of a polymeric material and adapted for securing a cable within a cable hanger. The grommet includes a main body having a generally cylindrical profile with a top edge and a bottom edge. The main body further having a length, a thickness, and a longitudinal axis. The grommet further includes a plurality of spokes extending radially inward from the main body at an oblique angle relative to the main body and an annular inner wall coupled to the plurality of angled spokes and surrounding an interior cavity. The annular inner wall extends the length of the main body. The grommet further includes a first annular flange extending radially outwardly from the top edge of the main body and a second annular flange extending radially outwardly from the bottom edge of the main body.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim and/or file any new claim accordingly, including the right to be able to amend any originally filed claim to depend from and/or incorporate any feature of any other claim or claims although not originally claimed in that manner. These and other objects and/or aspects of the present invention are explained in detail in the specification set forth below. Further features, advantages and details of the present invention will be appreciated by those of ordinary skill in the art from a reading of the figures and the detailed description of the preferred embodiments that follow, such description being merely illustrative of the present invention.

DETAILED DESCRIPTION

Figure 1A:
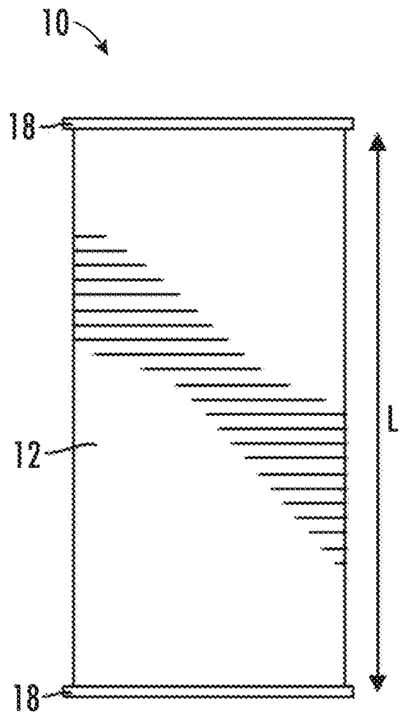
FIG. 1A (PRIOR ART)
FIG. 1A is a side view of a light or standard duty grommet.
Figure 1B:
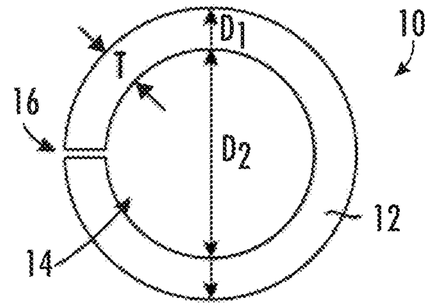
FIG. 1B (PRIOR ART)
FIG. 1B is a top view of the grommet of FIG. 1A.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components, or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer, or section. Thus, a first element, component, region, layer, or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the figures, a grommet 10 adapted for use with a cable hanger 100 is illustrated in FIGS. 1A-1D. The grommet 10 shown in FIGS. 1A-1D is sometimes known as a "light" or "standard duty" grommet. Exemplary grommets are described in U.S. Pat. No. 10,830,978 to Wang et al. and U.S. Pat. No. 11,204,109 to Vaccaro et al., the disclosures of which are hereby incorporated herein in their entireties. The grommet 10 comprises a main body 12 having two ends 18. The main body 12 surrounds an interior cavity 14. The grommet 10 is formed of a polymeric material and is adapted for holding a cable 150 within a cable hanger 100 (see, e.g., FIG. 1C and FIG. 1D). For example, the grommet 10 may comprise rubber (e.g., EPDM), polypropylene, nylon, thermoplastic elastomer (TPE), thermoplastic copolyester elastomer (TPC-ET), acrylonitrile butadiene styrene (ABS), or the like. The main body 12 of the grommet 10 has a length (L), a thickness (T), and a longitudinal axis defined by its length dimension. The main body 12 may have an outer diameter ($D_1$) and an inner diameter ($D_2$). The thickness (T) of the main body 12 can be determined by subtracting the inner diameter ($D_2$) from the outer diameter ($D_1$) and dividing by two. The diameters ($D_1$, $D_2$) of the main body 12 can vary depending on the diameter of the cable 150 being held within the grommet 10.

The main body 12 may have a slot 16 extending along its length (L). The slot 16 provides an entry point for the cable 150 to be inserted into the interior cavity 14. The polymeric material that forms the grommet 10 gives the grommet 10 a certain degree of flexibility, such that the grommet 10 may be deflected to an open position to enable insertion of the cable 150. Once the cable 150 is positioned within the interior cavity 14 of the grommet 10, the resilient nature of polymeric material allows the grommet 10 to recover toward its original size, thereby securing the cable 150 within the grommet 10. Exemplary types of cables 150 that may be secured within the grommet 10 include, but are not limited to, power cables, fiber optic cables and hybrid fiber/power cables.

Figure 1C:
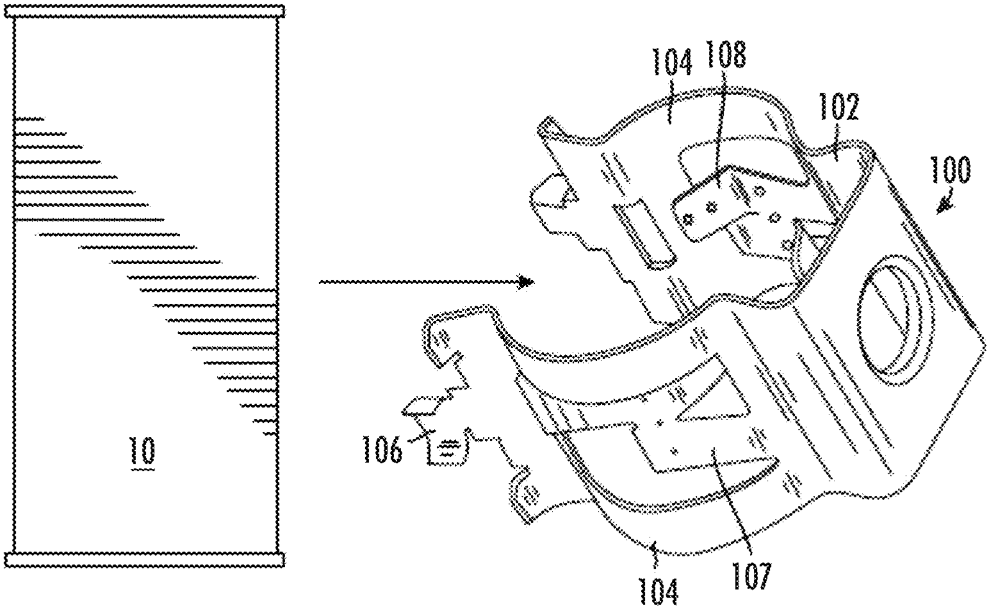
FIG. 1C (PRIOR ART)
FIG. 1C is an exploded perspective view showing the grommet of FIG. 1A in combination with a cable hanger.
Figure 1D:
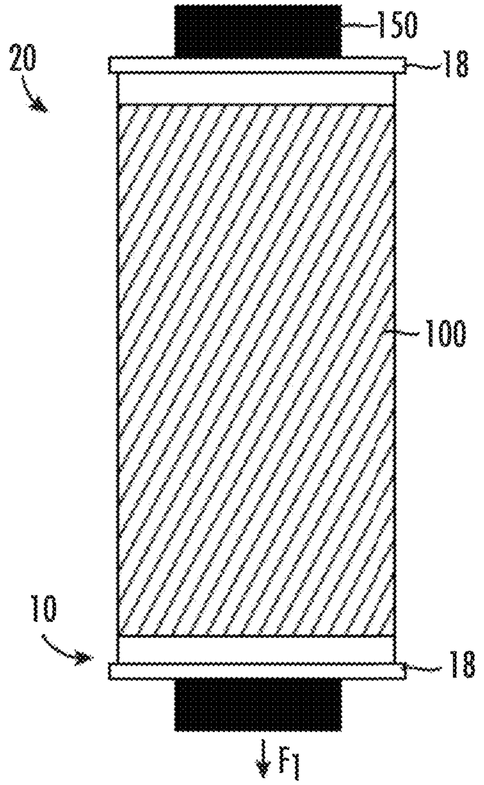
FIG. 1D (PRIOR ART)
FIG. 1D is a side view of the grommet of FIG. 1A in combination with a cable and secured within a cable hanger.

The ends 18 of the grommet 10 may protrude from the main body 12 to provide additional stability when the grommet 10 is used with a cable hanger 100 (see, e.g., FIG. 1C and FIG. 1D). However, in some instances, when an excessive (load) force $F_1$ is applied to (or by) a cable 150 (e.g., the cable 150 is pulled or a heavier weighted cable is used) that is held within the grommet 10 and secured within the cable hanger 100 (e.g., cable hanger assembly 20 shown in FIG. 1D), the small, pliable/flexible protruding ends 18 of the grommet 10 may not provide sufficient support to hold the grommet 10 within the cable hanger 100, and thus, may result in the grommet 10 being pulled away from the cable hanger 100 (i.e., no longer being secured within the cable hanger 100).

Figure 2A:
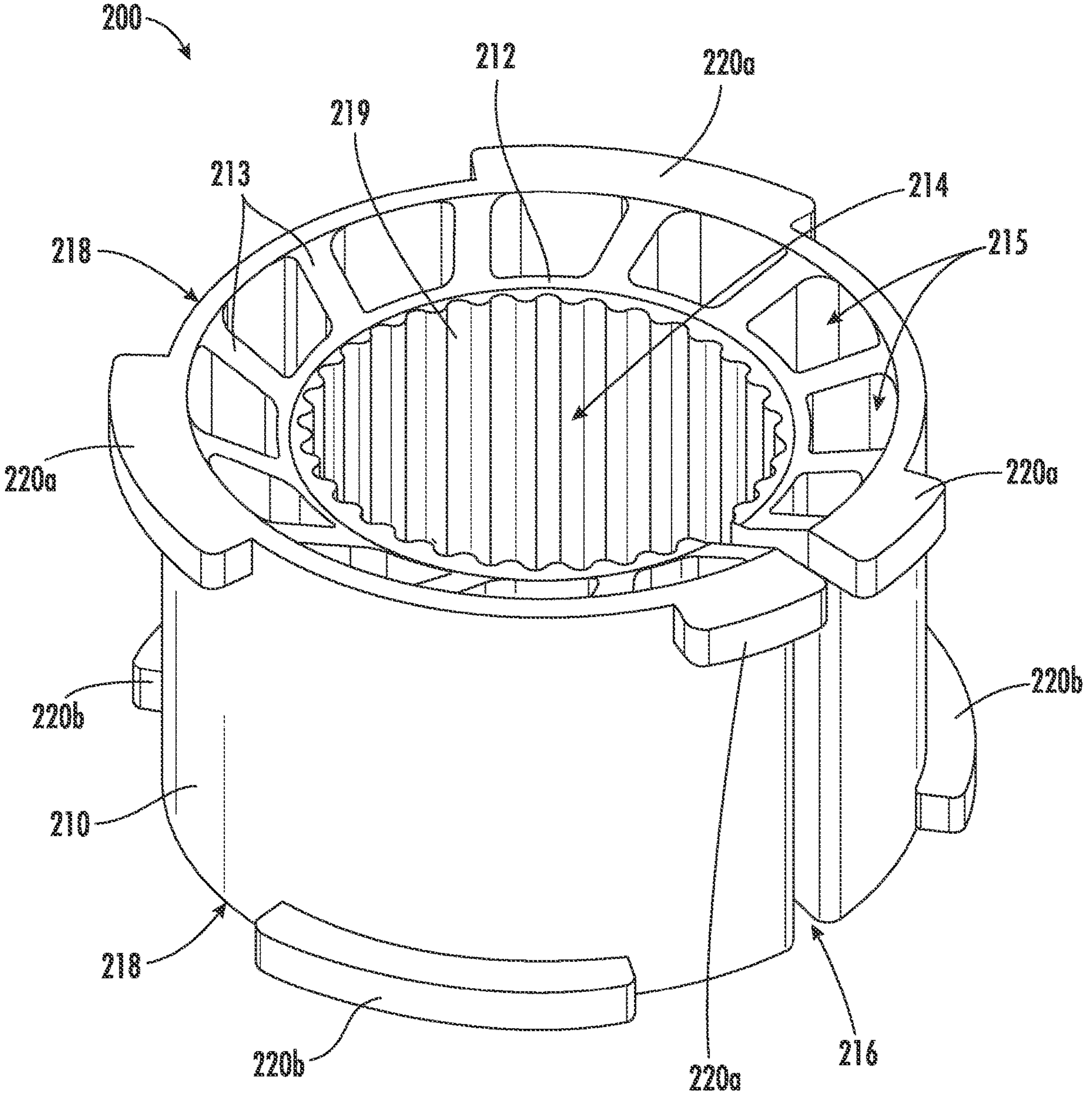
FIG. 2A is a top perspective view of a grommet according to embodiments of the present invention.
Figure 2B:
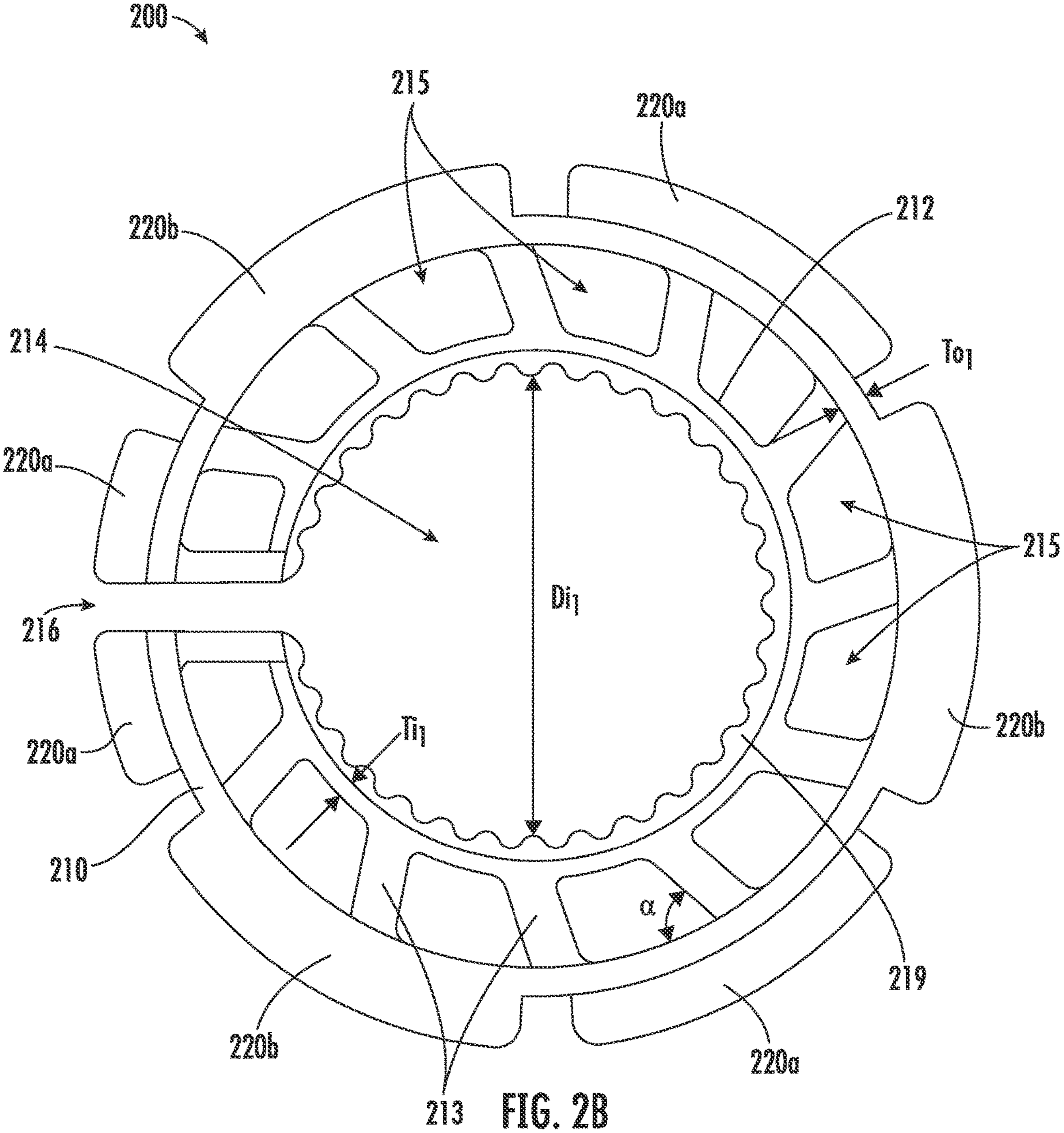
FIG. 2B is a bottom view of the grommet of FIG. 2A.
Figure 2C:
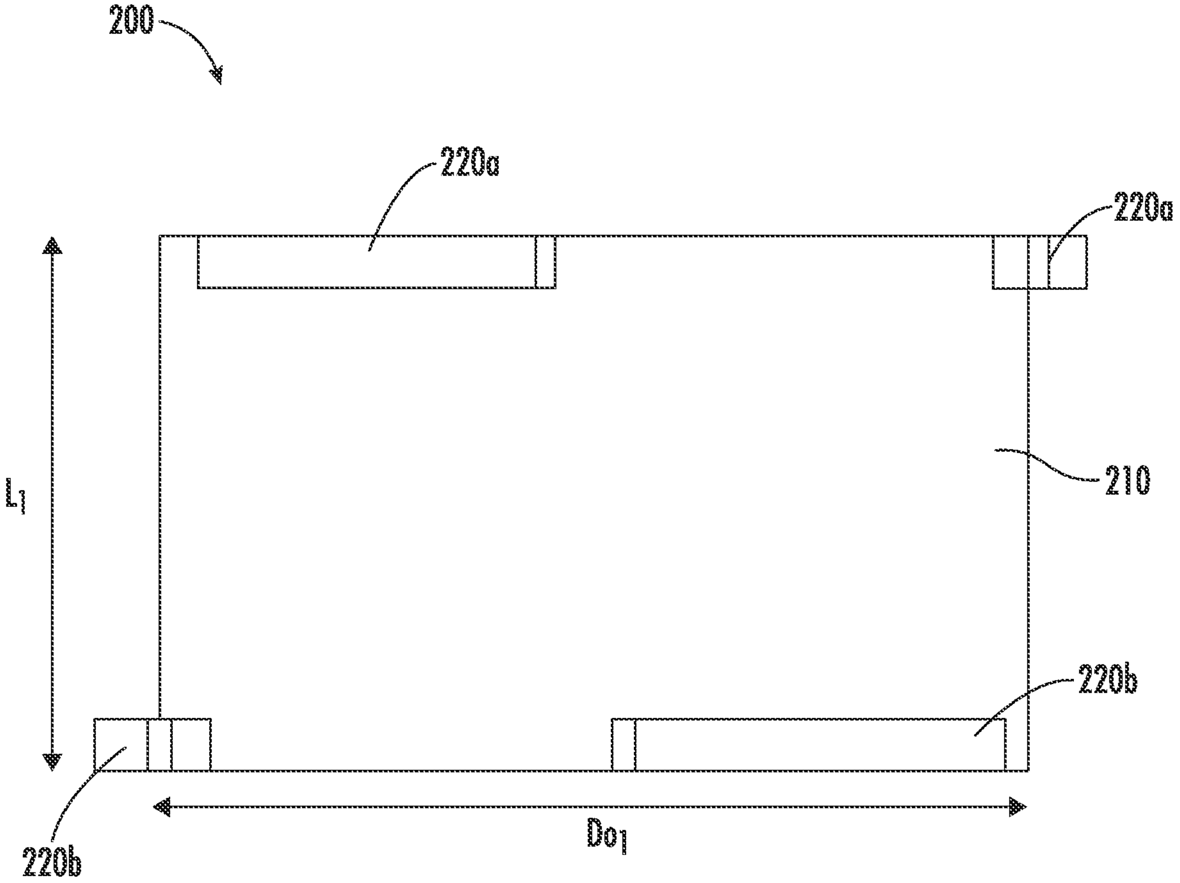
FIG. 2C is a side view of the grommet of FIG. 2A.

To overcome this potential issue, a grommet 200 of the present invention illustrated in FIGS. 2A-2C may be used instead of the light or standard duty grommet 10. Properties and/or features of the grommet 200 may be as described above in reference to the grommet 10 shown in FIGS. 1A-1D and duplicate discussion thereof may be omitted herein for the purposes of discussing FIGS. 2A-2C. See also, e.g., U.S. Patent Publication No. 2022/0139598 to Vaccaro et al., the disclosure of which is hereby incorporated herein in its entirety.

As shown in FIGS. 2A-2C, the grommet 200 comprises a main body 210 having two ends 218. The main body 210 of the grommet 200 has a length ($L_1$) and a longitudinal axis defined by its length dimension. A plurality of spokes 213 extends radially inward from an inner surface of the main body 210. The opposing end of each spoke 213 is coupled to or integral with an annular inner wall 212. While thirteen (13) spokes 213 are shown in the figures (e.g., FIGS. 2A-2B), the number of spokes 213 within the grommet 200 may vary (e.g., more or less than 13 spokes). For example, in some embodiments, the grommet 200 may comprise only eight (8) spokes 213. The number of spokes 213 may be chosen, for example, based on strength and ease for expansion needed for the grommet 200 to hold a particular type of cable 150.

The main body 210 forms an outer diameter ($Do_1$) of the grommet 200 and the annular inner wall 212 forms an inner diameter ($Di_1$) of the grommet 200. The diameters ($Do_1$, $Di_2$) of the main body 210 and inner wall 212 can vary depending on the diameter of the cable 150 to be held within the grommet 200. The annular inner wall 212 surrounds an interior cavity 214, and in some embodiments, may extend the length ($L_1$) of the grommet 200. In some embodiments, each of the spokes 213 may also extend the length ($L_1$) of the grommet 200.

Figure 3A:
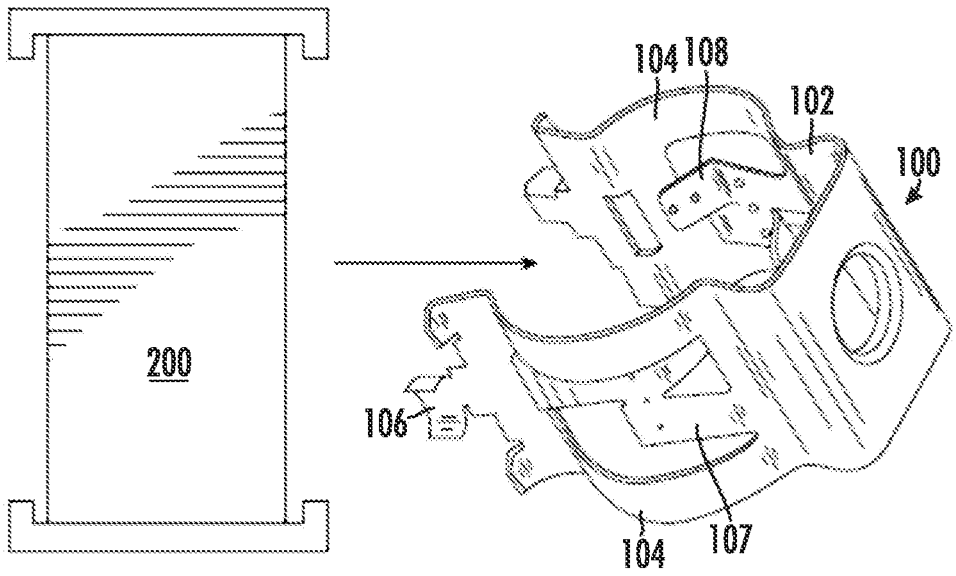
FIG. 3A is an exploded perspective view showing the grommet of FIG. 2A in combination with a cable hanger.
Figure 3B:
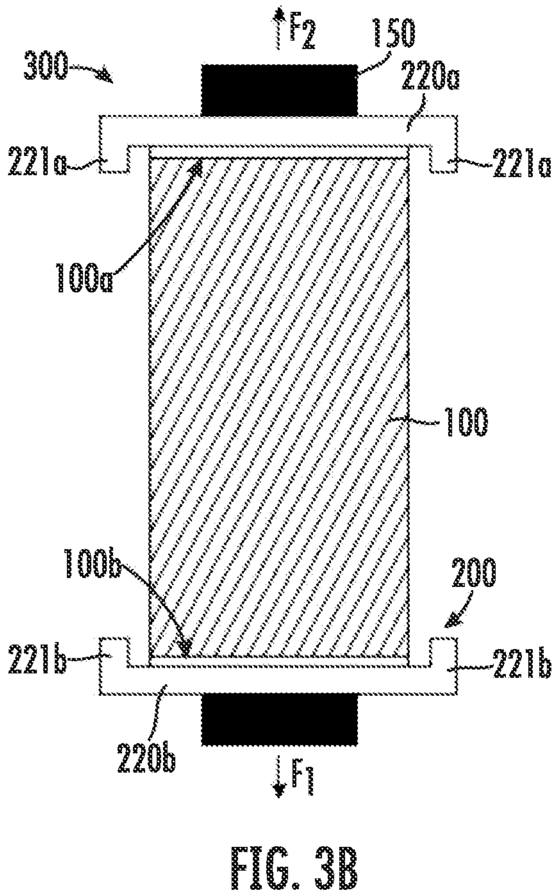
FIG. 3B is a side view of the grommet of FIG. 3A in combination with a cable and secured within the cable hanger.

Similar to grommet 10 discussed herein, the grommet 200 of the present invention is formed of a polymeric material and is adapted for holding a cable 150 within a cable hanger 100 (see, e.g., FIGS. 3A-3B). In some embodiments, the grommet 200 may be formed by injection molding. The polymeric material that forms the grommet 200 gives the grommet 200 a certain degree of flexibility, such that the grommet 200 may be deflected to an open position to enable insertion of the cable 150. In some embodiments, each spoke 213 is separated by an opening 215 which provides space for the spokes 213 to deflect when a cable 150 is inserted into the interior cavity 214 of the grommet 200. Once the cable 150 is positioned within the interior cavity 214 of the grommet 200, the resilient nature of polymeric material allows the grommet 200 to recover to its original size, thereby securing the cable 150 within the grommet 200. Similar types of cables 150 may be secured within the grommet 200 as grommet 10 described above, for example, power cables, fiber optic cables, and hybrid fiber/power cables.

As shown in FIG. 2B, in some embodiments, each spoke 213 may extend radially inward at an oblique angle ($\alpha$) from the main body 210. In some embodiments, each spoke 213 may extend radially inward at an angle ($\alpha$) in a range of from about 40 degrees to about 75 degrees. The angle ($\alpha$) of the spokes 213 may allow for easier deflection of the spokes 213 by a cable 150 (e.g., into an adjacent opening 215) when the cable 150 is inserted into the interior cavity 214 of the grommet 200. In addition, the oblique angle ($\alpha$) of the spokes 213 allows for a predictable direction of collapse, thereby preventing adjacent spokes 213 from deflecting into each other and causing a "hard deflection" or compression. For example, if the spokes 213 extended exactly radially (i.e., if the angle ($\alpha$) was 90 degrees), under the compression of a cable 150, the spokes 213 may be inclined to bow in either direction; and if adjacent spokes 213 were to bow toward each other, they may contact each other and resist deflection. By including spokes 213 that extend at an oblique angle (e.g., angle ($\alpha$)) relative to the main body 210, the deflection of the spokes 213 under compression is predictable (i.e., the angle decreases under compression for all spokes 213), such that no interference between adjacent spokes 213 occurs.

As noted above, one or more cables 150 may be secured within the interior cavity 214 of the grommet 200. In some embodiments, the grommet 200 (e.g., the main body 210 and inner wall 212) may have a slot 216 extending along its length ($L_1$). The slot 216 provides an entry point for the cable 150 to be inserted into the interior cavity 214. The slot 216 (and polymeric material of the grommet 200) allows the grommet 200 to be deflected into an open position to enable insertion of the cable 150.

As shown in FIGS. 2A-2B, in some embodiments, an inner surface of the annular inner wall 212 may comprise one or more gripping features 219. The gripping features 219 may be configured to further secure a cable 150 within the interior cavity 214 of the grommet 200. For example, the one or more gripping features 219 may include a plurality of protrusions, ridges, or "teeth" that assist in gripping the cable 150 when inserted into the interior cavity 214, thereby helping to further secure the cable 150 within the grommet 200.

As shown in FIG. 2B, the main body 210 of the grommet 200 has a thickness ($To_1$) and the inner wall 212 has a thickness ($Ti_1$). In some embodiments, the thickness ($To_1$) of the main body 210 may be greater than the thickness ($Ti_1$) of the inner wall 212. For example, in some embodiments, the thickness ($To_1$) of the main body 110 may be about 2.5 millimeters (mm) and the thickness ($Ti_1$) of the inner wall 212 may be about 2 mm. In some embodiments, a thin annular inner wall 212 may allow for easier expansion (i.e., of the polymeric material forming the inner wall 212), for example, when the cable 150 is inserted into the interior cavity 214 of the grommet 200. Whereas, in some embodiments, a thicker main body 210 may help to maintain the shape of the grommet 200 and provide additional structural support to the grommet 200, for example, when the cable 150 is inserted into the interior cavity 214 of the grommet 200.

In addition, in some embodiments, the grommet 200 of the present invention may further include multiple arms (or "wings") 220*a*, 220*b* that extend radially outwardly from the ends 218 of the grommet 200, i.e., top arms 220*a* and bottom arms 220*b*. In some embodiments, the number of top arms 220*a* is equal to the number of bottom arms 220*b*. For example, as shown in FIG. 2B, in some embodiments, the grommet 200 includes three (3) top arms 220*a* and three (3) bottom arms 220*b*. However, it will be appreciated by those skilled in the art that any number of top and/or bottom arms 220*a*, 220*b* may be used to combine strength, ease of manufacturing (i.e., molding), ease of use, depending on the type and size of cable 150 to be secured within the grommet 200.

As shown in FIGS. 2A-2C, in some embodiments, each of the top arms 220*a* is circumferentially staggered or offset from each of the bottom arms 220*b*. By staggering the arms 220*a*, 220*b* of the grommet 200, during manufacturing, the mold halves forming the grommet 200 during molding may separate without being obstructed by the arms 220*a*, 220*b* at the opposite end of the grommet 200, thereby making manufacturing the grommet 200 easier and less expensive.

In some embodiments, each arm 220*a*, 220*b* may include a flanged edge 221*a*, 221*b* that extends generally parallel to the main body 210 of the grommet 200, i.e., the flanged edges of the top arms 220*a* extend downwardly and the flanged edges of the bottom arms 220*b* extend upwardly (see, e.g., FIG. 3B). As shown in FIGS. 3A-3B, the arms 220*a*, 220*b* of the grommet 200 are configured to engage respective upper and lower edges 100*a*, 100*b* of a cable hanger 100, thereby preventing the grommet 200 from being pulled from the cable hanger 100 in either direction. The arms 220*a*, 220*b* of the grommet 200 allow the grommet 200 to resist an excessive force (e.g., load) $F_1$, $F_2$ from either direction (i.e., non-directional assembly), and enable a technician to install the grommet 200 either "upside-down" or "right-side-up" without impacting the effectiveness of the grommet 200 in holding a cable 150.

Still referring to FIGS. 3A-3B, and as discussed herein, the grommet 200 may be used in combination with a cable hanger 100, shown as cable assembly 300. Coaxial cables for power and/or signal communications are often mounted to a foundation structure, e.g., an antenna tower, via cable hangers 100, which capture the cable 150 and mount it to the structure. The cable hanger 100 may include a generally C-shaped body 102 having two opposable arms 104. The opposable arms 104 may have latches 106 that extend away from the cable hanger body 102. In some embodiments, the cable hanger 100 may be dimensioned to receive the grommet 200 of the present invention such that the grommet 200 can be held between the opposable arms 104 of the cable hanger 100, with the flanged edges 220*a*, 220*b* engaging the upper and lower edges 100*a*, 100*b* of the cable hanger 100. Some cable hangers 100 may have flex members 107 with gripping members 108. In some embodiments, the main body 210 of the grommet 200 may have at least one groove or indention (not shown) configured to allow the gripping members 108 of the cable hanger 100 to grip onto the grommet 200, thereby further securing the grommet 200 within the cable hanger 100. Exemplary cable hangers are shown in U.S. Pat. No. 9,306,380 to Vaccaro; U.S. Pat. No. 9,866,004 to Vaccaro et al.; and U.S. Pat. No. 9,903,510 to Joshi et al., each of which are incorporated by reference in their entirety herein. The combination of the grommet 200 and cable hanger 100 can be mounted to the foundation structure via the latches 106.

In some embodiments, the main body 210 of the grommet 200 may have a generally cylindrical profile that surrounds the interior cavity 214. In some embodiments, the main body 210 may have a profile shape other than cylindrical, for example, the main body 210 may be hexagonal, square, oval, oblong, etc. in profile. The main body 210 of the grommet 200 is typically sized such that its outer diameter fits snugly within the cable hanger 100, and thus may be slightly larger than the inner diameter of the cable hanger 100. The inner diameter ($Di_1$) of the annular inner wall 212 of the grommet 200 is sized to capture a cable 150. In some embodiments, the annular inner wall 212 has an inner diameter ($Di_1$) from about 0.2 inches to about 2.5 inches. In some embodiments, the main body 210 has an outer diameter ($Do_1$) from about 0.5 inches to about 3.0 inches. In some embodiments, the main body 210 can have a length ($L_1$) from about 0.7 inches to about 2.5 inches.

The grommet 200 of the present invention may provide for some advantages over other known grommets. For example, the grommet 200 can be formed via injection molding. Next, all of the features of the grommet 200 are formed in the same plane which means that no cams are needed in the tooling (i.e., less expensive tooling), and thus, the grommet 200 is less expensive to manufacture. Moreover, the thin annular inner wall 212 of the grommet 200 minimizes materials and maximizes air space. Other known grommets having thick walls with a lot of material (e.g., plastic) have the tendency to go "solid" which causes high compression needs. The thin annular inner wall 212 of the grommet 200 of the present invention helps to minimize this occurrence. In addition, minimizing the polymer materials used in forming the grommet 200 allows for reduced material costs and more efficient and faster manufacturing cycle times (e.g., less material allows the manufactured grommet 200 to cool quicker). Further, molding the slot 216 while forming the grommet 200 eliminates the need for a secondary slitting operation, thereby further reducing manufacturing costs. Finally, as discussed above, including oblique angled spokes 213 allows for easy deflection of the spokes 213 by a cable 150 inserted into the grommet 200, while also provides a means for a predictable collapse direction such that adjacent spokes 213 avoid colliding into each other, thereby helping to prevent the spokes 213 from going "solid" and causing hard deflection or compression, i.e., contacting each other and resisting deflection.

Figure 4A:
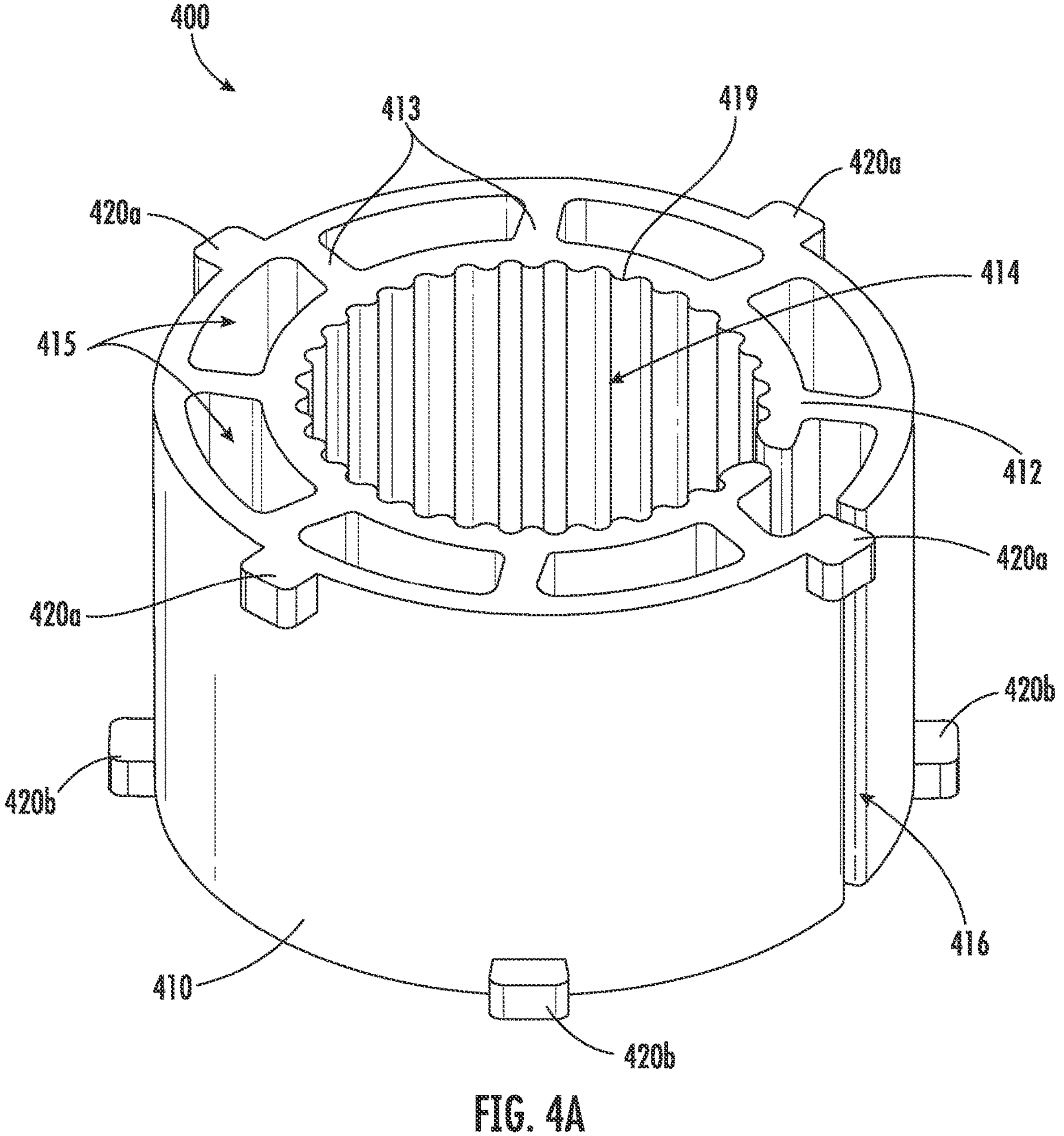
FIG. 4A is a top perspective view of a grommet according to embodiments of the present invention.
Figure 4B:
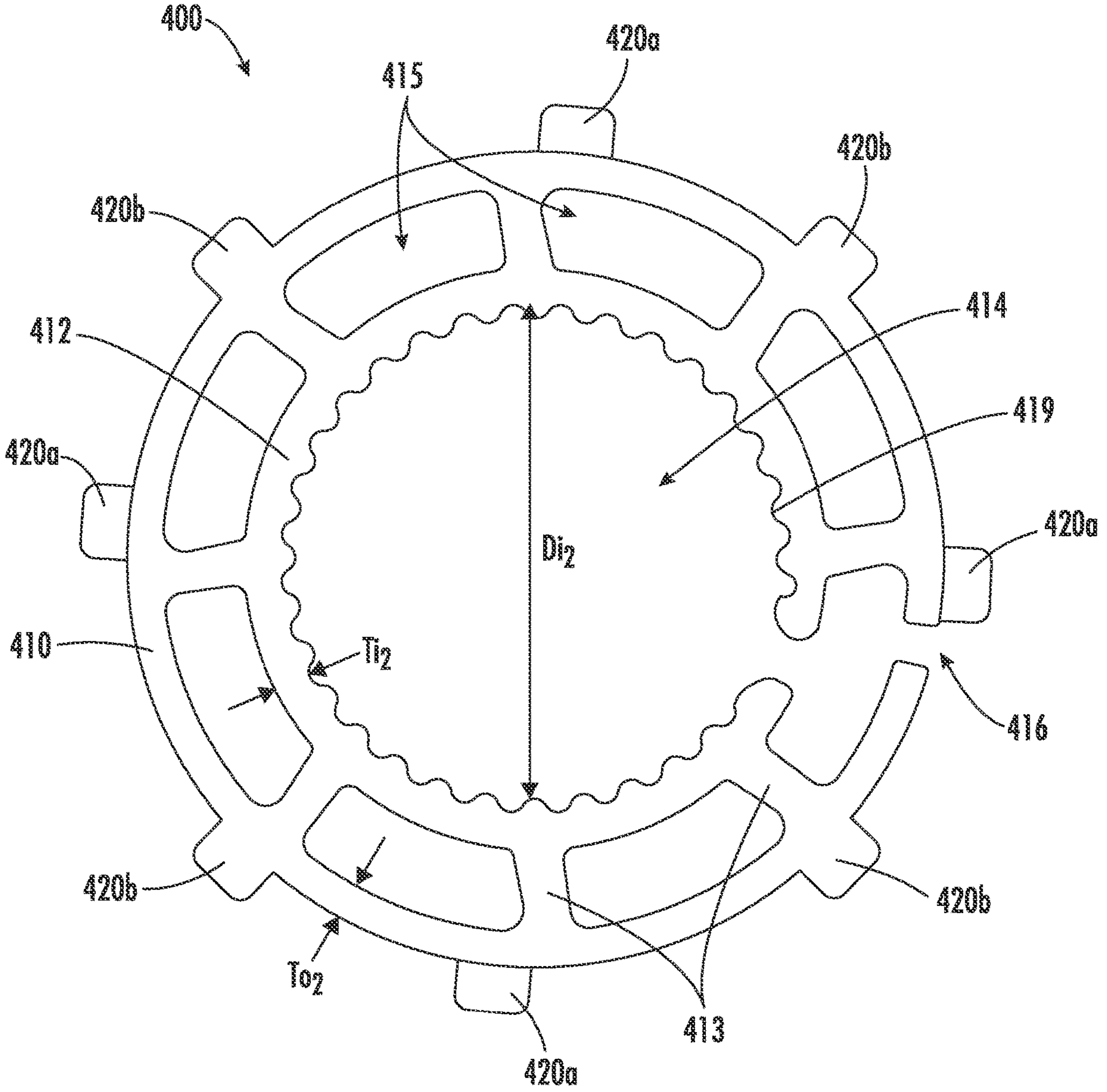
FIG. 4B is a bottom view of the grommet of FIG. 4A.
Figure 4C:
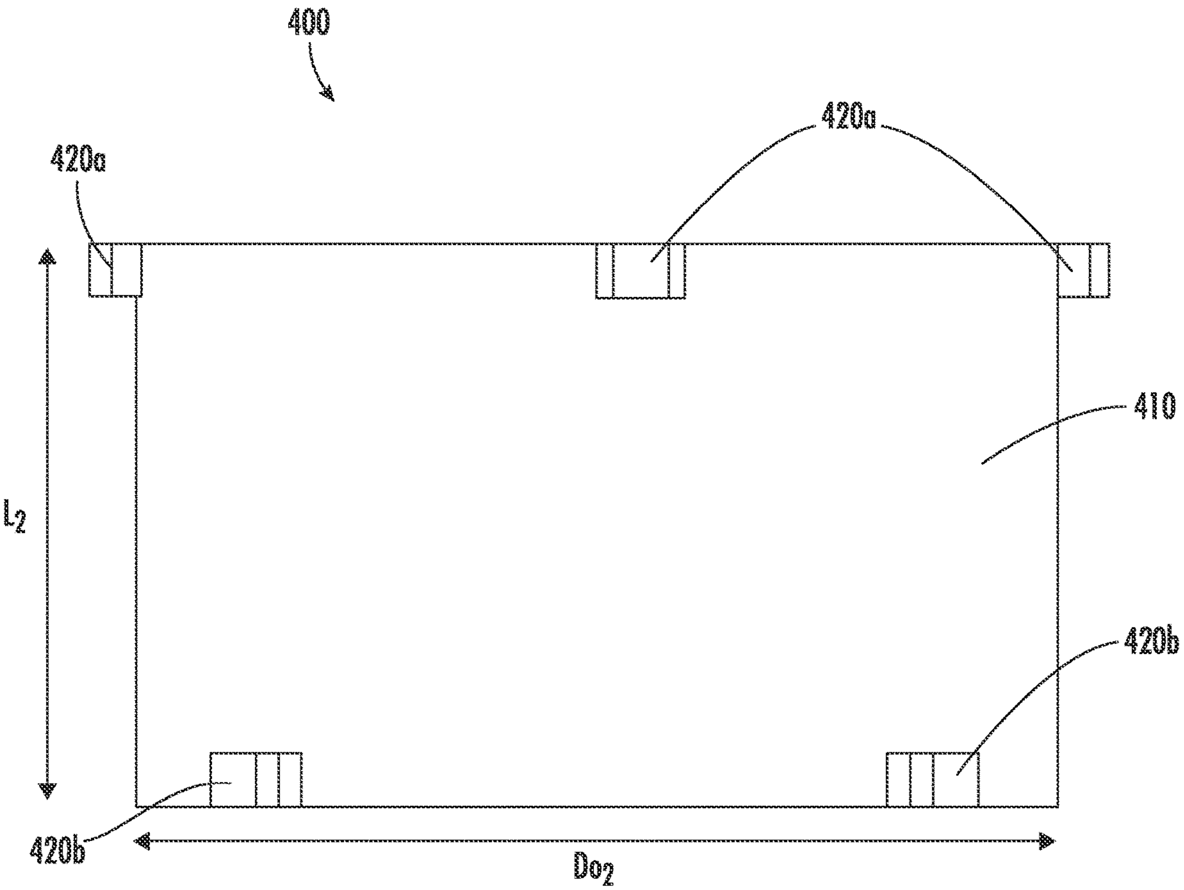
FIG. 4C is a side view of the grommet of FIG. 4A.

Referring now to FIGS. 4A-4C, an alternative grommet 400 according to embodiments of the present invention is illustrated. Properties and/or features of the grommet 400 may be as described above in reference to the grommet 200 shown in FIGS. 2A-3B and duplicate discussion thereof may be omitted herein for the purposes of discussing FIGS. 4A-4C.

As shown in FIGS. 4A-4C, the grommet 400 differs from grommet 200 in that the plurality of spokes 413 of grommet 400 do not extend radially inward from the main body 410 at an oblique angle, but instead are generally perpendicular (i.e., 90 degrees) to the main body 410 (see, e.g., FIG. 4B). In addition, the top and bottom arms 420*a*, 420*b* of grommet 400 cover a shorter circumferential arc compared to the top and bottom arms 220*a*, 220*b* of grommet 200. Similar to the grommet 200 described above, the top and bottom arms 420*a*, 420*b* of grommet 400 are configured to engage respective upper and lower edges 100*a*, 100*b* of a cable hanger 100, thereby preventing the grommet 400 from being pulled from the cable hanger 100 in either direction (e.g., similar to cable hanger assembly 300 shown in FIG. 3B). The arms 420*a*, 420*b* (and flanged edges, where applicable) of the grommet 400 allow the grommet 400 to resist an excessive force (e.g., load) $F_1$, $F_2$ from either direction (i.e., non-directional), and enable a technician to install the grommet 400 either "upside-down" or "right-side-up" without impacting the effectiveness of the grommet 400 in holding a cable 150. In some embodiments, the number of top arms 420*a* is equal to the number of bottom arms 420*b*. For example, as shown in FIG. 4B, in some embodiments, the grommet 400 includes four (4) top arms 420*a* and four (4) bottom arms 420*b*. However, similar to grommet 200, any number of top and bottom arms 420*a*, 420*b* for grommet 400 may be used.

Figure 5A:
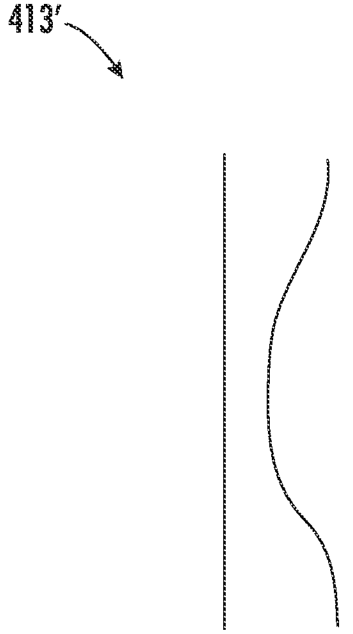
FIGS. 5A and 5B illustrate alternative exemplary configurations for the spokes of the grommet of FIG. 4A.
Figure 5B:
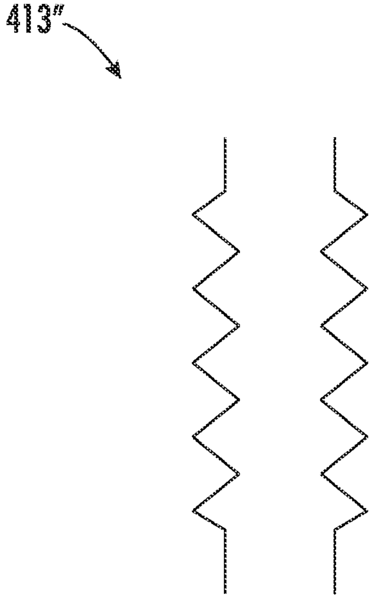

In some embodiments, the spokes 413 of grommet 400 may be configured to collapse in a predictable manner to avoid the interference issue discussed above in connection with the angled spokes 213. For example, as shown in FIG. 5A, the spokes 413' may be thinner in the center than at their ends, with the thinner section being slightly circumferentially offset. Such a configuration would encourage the spokes 413' to bend in a predictable manner. Alternatively, as shown in FIG. 5B, the spokes 413" may have a serpentine or sawtooth profile, which would encourage the spokes 413" to crush axially rather than bend circumferentially. Other configurations may also be possible.

Referring now to FIGS. 6A-6C and FIGS. 7A-7C, alternative grommets 500, 600 according to embodiments of the present invention are illustrated. Properties and/or features of the grommets 500, 600 may be as described above in reference to the grommets 200, 400 shown in FIGS. 2A-4C and duplicate discussion thereof may be omitted herein for the purposes of discussing FIGS. 6A-6C and FIGS. 7A-7C.

As shown in FIGS. 6A-6C and FIGS. 7A-7C, the grommets 500, 600 differ from the grommets 200, 400 described herein in that the staggered top and bottom arms 220*a*, 220*b*, 420*a*, 420*b* of grommets 200, 400 are replaced with top and bottom flanged edges 520*a*, 520*b*, 620*a*, 620*b* that extend radially outwardly from, and circumferentially around, the top and bottom edges of the main body 510, 610 of the respective grommets 500, 600. Similar to the staggered top and bottom arms 220*a*, 220*b*, 420*a*, 420*b* of grommets 200, 400, the annular flanged edges 520*a*, 520*b*, 620*a*, 620*b* of respective grommets 500, 600 are configured to engage respective upper and lower edges 100*a*, 100*b* of a cable hanger 100, thereby preventing the grommets 500, 600 from being pulled from the cable hanger 100 in either direction (e.g., similar to cable hanger assembly 300 shown in FIG. 3B). The annular flanged edges 520*a*, 520*b*, 620*a*, 620*b* of the grommets 500, 600 allow the grommets 500, 600 to resist an excessive force (e.g., load) $F_1$, $F_2$ (see, e.g., FIG. 3B) from either direction (i.e., non-directional), and enable a technician to install the grommets 500, 600 either "upside-down" or "right-side-up" without impacting the effectiveness of the grommet 500, 600 in holding a cable 150.

Figure 6A:
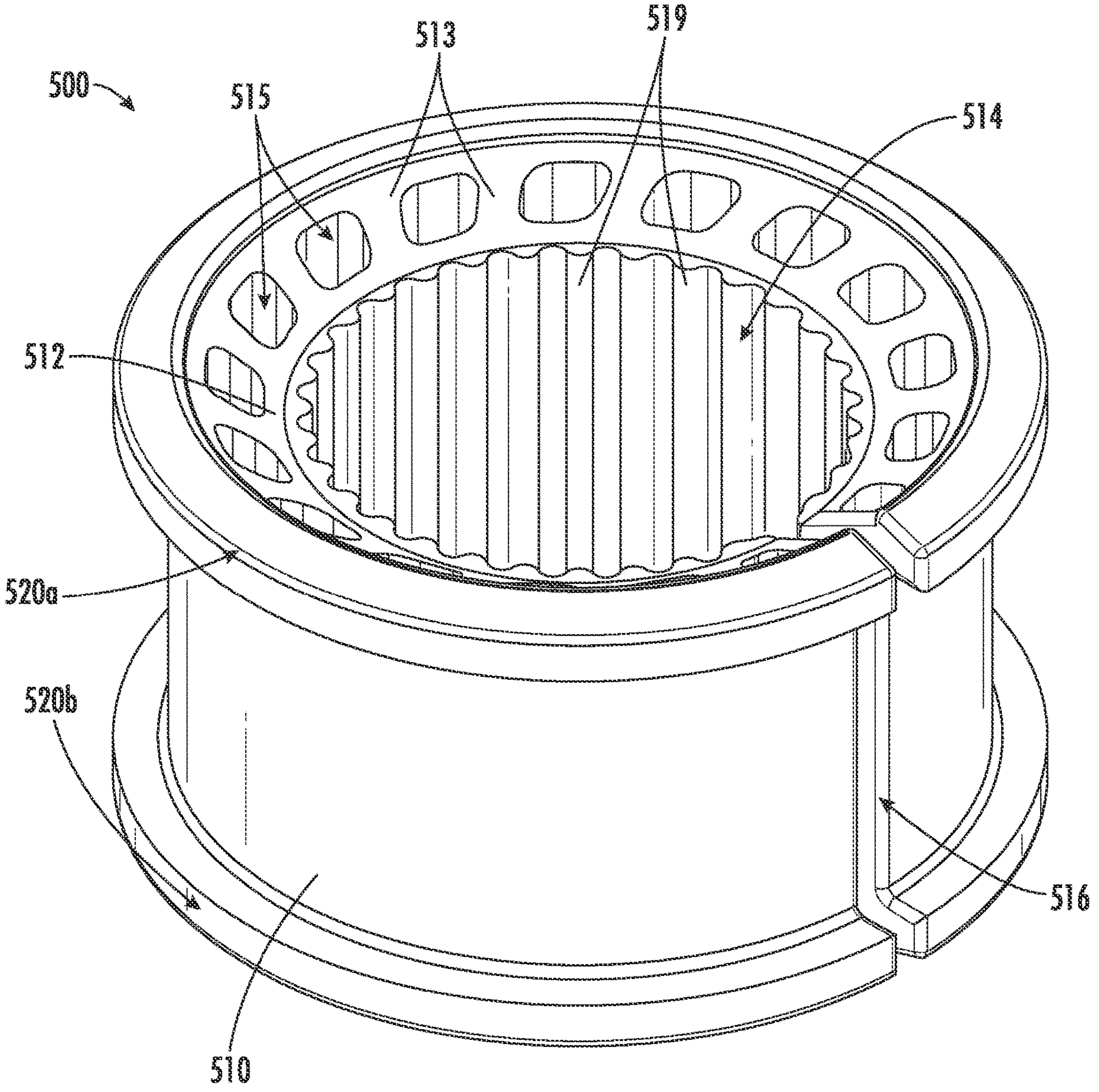
FIG. 6A is a top perspective view of a grommet according to embodiments of the present invention.
Figure 6B:
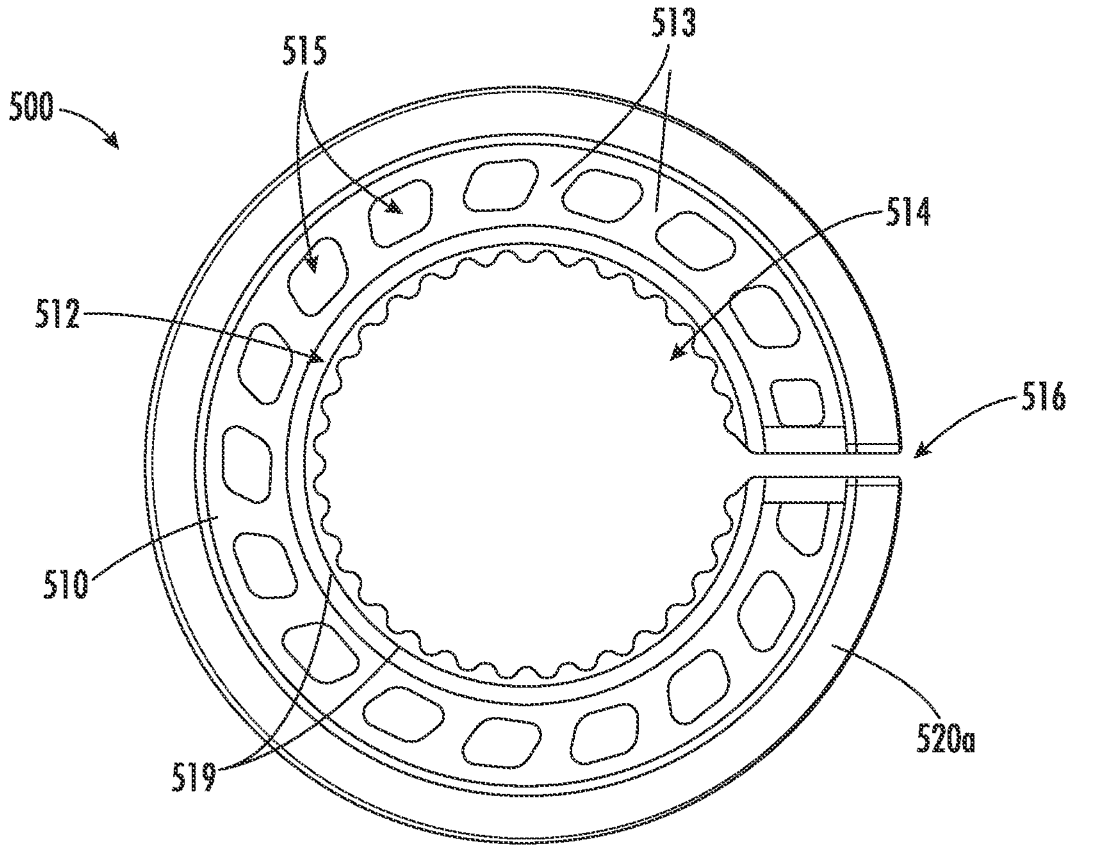
FIG. 6B is a top view of the grommet of FIG. 6A.
Figure 6C:
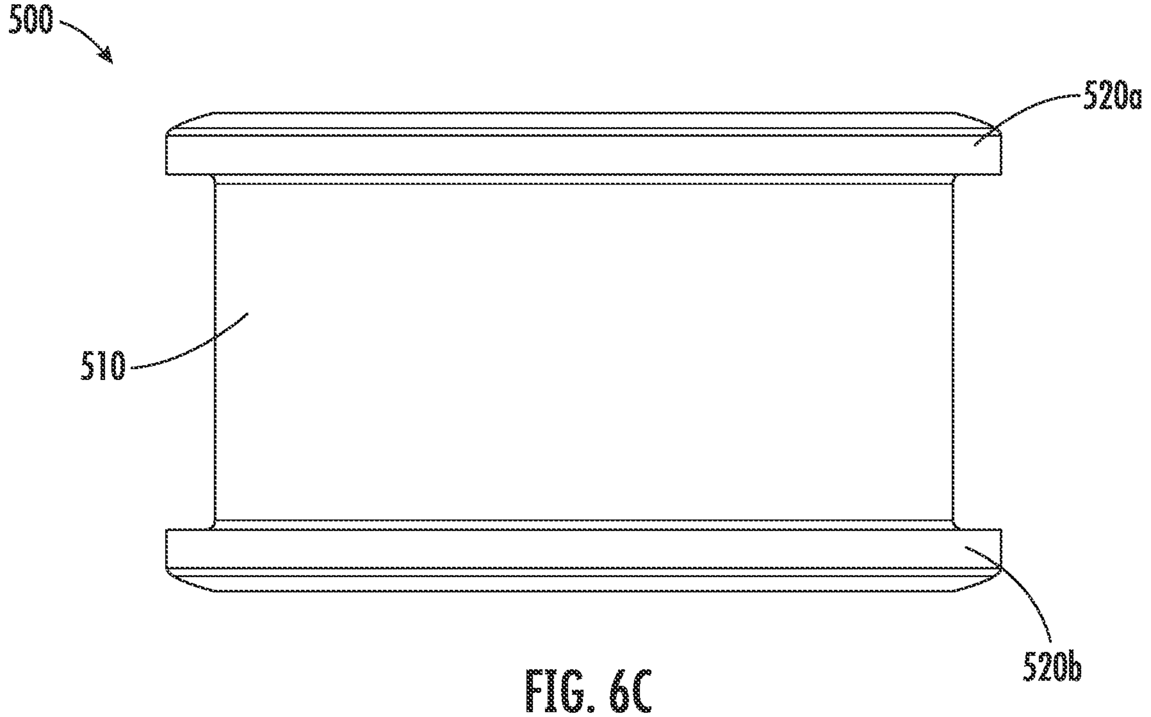
FIG. 6C is a side view of the grommet of FIG. 6A.
Figure 7A:
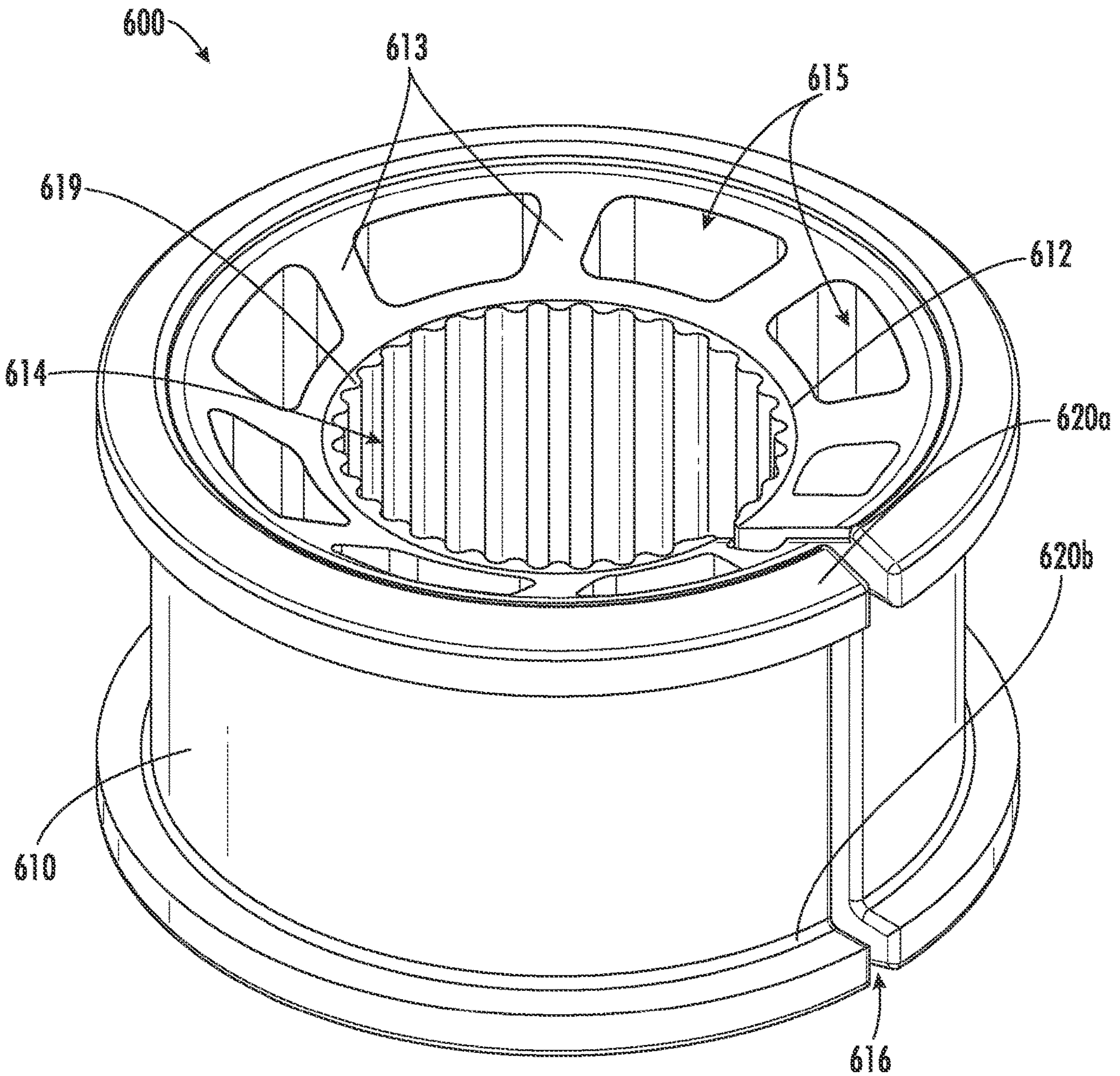
FIG. 7A is a top perspective view of a grommet according to embodiments of the present invention.
Figure 7B:
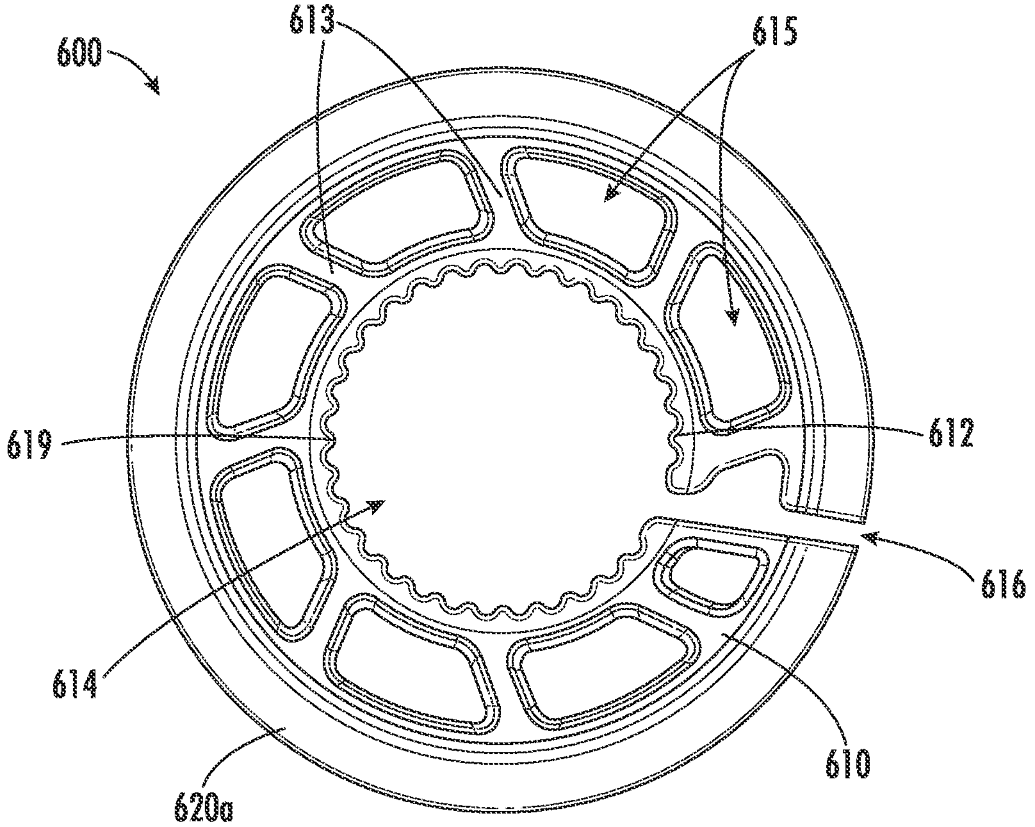
FIG. 7B is a top view of the grommet of FIG. 7A.
Figure 7C:
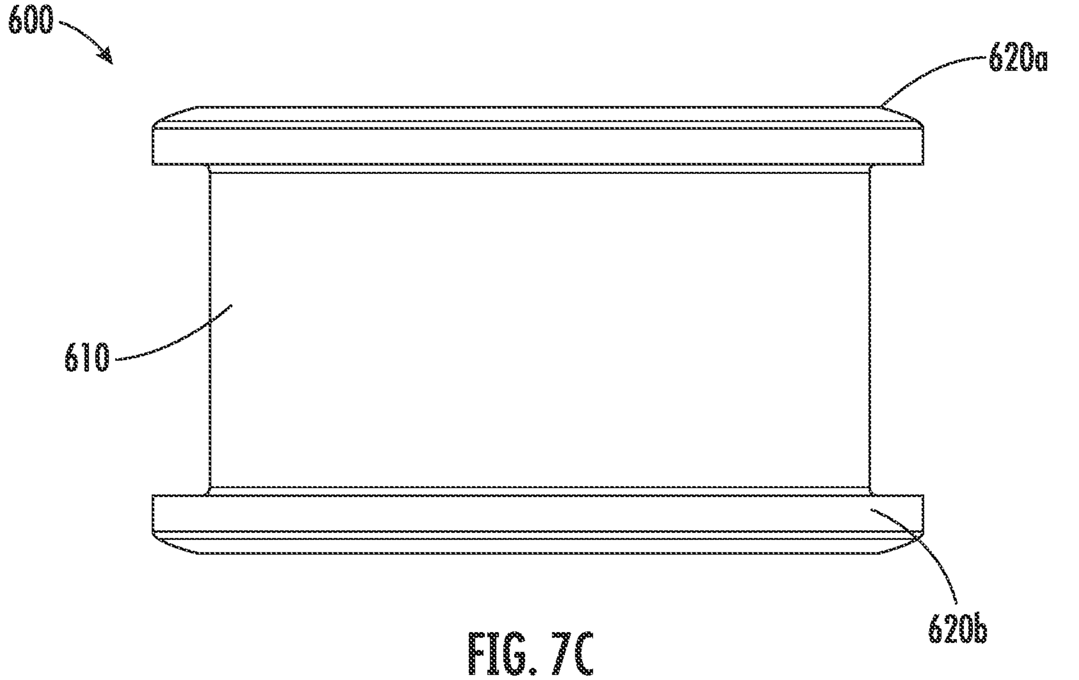
FIG. 7C is a side view of the grommet of FIG. 7A.

Similar to the other grommets 200, 400 described herein, as shown in FIGS. 6A-6B and FIGS. 7A-7B, the grommets 500, 600 include a plurality of spokes 513, 613 that extend radially inward from an inner surface of the main body 510, 610. The opposing end of each spoke 513, 613 is coupled to or integral with an annular inner wall 512, 612. The number of spokes 513, 613 within the grommets 500, 600 may vary and may be chosen, for example, based on strength and ease for expansion needed for the grommet 500, 600 to hold a particular type of cable 150. For example, as shown in FIGS. 6A-6B, the grommet 500 has eighteen (18) spokes 513, whereas the grommet 600 has nine (9) spokes 613, as shown in FIGS. 7A-7B. The annular inner walls 512, 612 of the grommets 500, 600 surround an interior cavity 514, 614 that may extend the length of the respective grommets 500, 600. In some embodiments, each of the spokes 513, 613 may also extend the length of the respective grommets 500, 600.

Also similar to the other grommets 200, 400 discussed herein, the grommets 500, 600 are formed of a polymeric material and are adapted for holding a cable 150 within a cable hanger 100 (see, e.g., FIGS. 3A-3B). For example, in some embodiments, the grommets 500, 600 may comprise rubber (e.g., EPDM), polypropylene, nylon, thermoplastic elastomer (TPE), thermoplastic copolyester elastomer (TPC-ET), acrylonitrile butadiene styrene (ABS), or the like. In some embodiments, the grommets 500, 600 may be formed by injection molding. The polymeric material that forms the grommets 500, 600 gives the grommets 500, 600 a certain degree of flexibility, such that the grommets 500, 600 may be deflected to an open position to enable insertion of the cable 150. In some embodiments, each spoke 513, 613 is separated by an opening 515, 615 which provides space for the spokes 513, 613 to deflect when a cable 150 is inserted into the interior cavity 514, 614 of the respective grommet 500, 600. Once the cable 150 is positioned within the interior cavity 514, 614 of the grommet 500, 600, the resilient nature of polymeric material allows the grommet 500, 600 to recover to its original size, thereby securing the cable 150 within the grommet 500, 600. Similar types of cables 150 may be secured within the grommets 500, 600 as described herein, for example, power cables, fiber optic cables, and hybrid fiber/power cables.

Similar to grommet 200 described herein (see, e.g., FIG. 2B), in some embodiments, each spoke 513, 613 of grommets 500, 600 may extend radially inward at an oblique angle from the main body 510, 610. In some embodiments, each spoke 513, 613 may extend radially inward at an angle in a range of from about 40 degrees to about 75 degrees. The angle of the spokes 513, 613 may allow for easier deflection of the spokes 513, 613 by a cable 150 (e.g., into an adjacent opening 515, 615) when the cable 150 is inserted into the interior cavity 514, 614 of the respective grommet 500, 600. In addition, the oblique angle of the spokes 513, 613 allows for a predictable direction of collapse, thereby preventing adjacent spokes 513, 613 from deflecting into each other and causing a "hard deflection" or compression. By including spokes 513, 613 that extend at an oblique angle (e.g., angle relative to the main body 510, 610), the deflection of the spokes 513, 613 under compression is predictable (i.e., the angle decreases under compression for all spokes 513, 613), such that no interference between adjacent spokes 513, 613 occurs.

As noted above, one or more cables 150 may be secured within the interior cavity 514, 614 of the grommet 500, 600. In addition, similar to the other grommets 200, 400 described herein, in some embodiments, the grommets 500, 600 (e.g., the main body 510, 610 and inner wall 512, 612) may have a slot 516, 616 extending along its length. The slot 516, 616 provides an entry point for the cable 150 to be inserted into the interior cavity 514, 614. The slot 516, 616 (and polymeric material) allows the grommet 500, 600 to be deflected into an open position to enable insertion of the cable 150.

Further, as shown in FIGS. 6A-6B and FIGS. 7A-7B, in some embodiments, an inner surface of the annular inner walls 512, 612 of the grommets 500, 600 may comprise one or more gripping features 519, 619. The gripping features 519, 619 may be configured to further secure a cable 150 within the interior cavity 514, 614 of the grommet 500, 600. For example, the one or more gripping features 519, 619 may include a plurality of protrusions, ridges, or "teeth" that assist in gripping the cable 150 when inserted into the interior cavity 514, 614, thereby helping to further secure the cable 150 within the grommet 500, 600.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A grommet, the grommet comprising:

a main body having a generally cylindrical profile and defining an outer diameter of the grommet;

an annular inner wall surrounding an interior cavity and defining an inner diameter of the grommet, the interior cavity being sized and configured to secure a cable therein;

a plurality of spokes extending between the main body and the annular wall, a first end of each of spoke is coupled to the main body and an opposing second end of each spoke is coupled to the annular wall, and each spoke extends at an oblique angle therebetween relative to the main body; and at least two arms extending radially outwardly from the main body, at least one of the arms extending from a bottom edge of the main body and at least one of the arms extending from a top edge of the main body, wherein the grommet is formed of a polymeric material and adapted for securing a cable within a cable hanger.

2. The grommet of claim 1, comprising at least four arms extending radially outwardly from the main body, wherein at least two of the arms extend from the bottom edge of the main body and at least two of the arms extend from the top edge of the main body, wherein the at least two arms extending from the top edge of the main body are circumferentially staggered relative to the position of the at least two arms extending from the bottom edge of the main body.

3. The grommet of claim 2, wherein the number of arms extending from the bottom edge of the main body is equal to the number of arms extending from the top edge of the main body.

4. The grommet of claim 1, wherein the oblique angle that each spoke extends radially inward from the main body is in a range of from about 40 degrees to about 75 degrees.

5. The grommet of claim 1, wherein an inner surface of the annular inner wall comprises a plurality of gripping features.

6. The grommet of claim 1, wherein the main body has a first thickness and the annular inner wall has a second thickness, and wherein the first thickness is greater than the second thickness.

7. The grommet of claim 1, further comprising a slot extending a length of the main body and annular inner wall.

8. The grommet of claim 1, in combination with the cable, wherein the cable resides within the interior cavity of the main body.

9. The grommet of claim 1, in combination with a cable hanger, wherein the cable hanger has opposable arms, and wherein the grommet is held between the opposable arms.

10. A grommet formed of a polymeric material and adapted for securing a cable within a cable hanger, the grommet comprising:

a main body having a generally cylindrical profile, the main body further having a length, a thickness, and a longitudinal axis;

a plurality of spokes extending radially inward from the main body;

an annular inner wall coupled to the plurality of spokes and surrounding an interior cavity, wherein the annular inner wall extends the length of the main body, and at least four arms extending radially outwardly from the main body, at least two of the arms extending from a bottom edge of the main body and at least two of the arms extending from a top edge of the main body, wherein the at least two arms on the top edge of the main body are circumferentially staggered relative to the position of the at least two arms on the bottom edge of the main body.

11. The grommet of claim 10, wherein each spoke is thinner at a center portion than at opposing ends.

12. The grommet of claim 10, wherein each spoke has a serpentine or sawtooth profile.

13. A grommet formed of a polymeric material and adapted for securing a cable within a cable hanger, the grommet comprising:

a main body having a generally cylindrical profile with a top edge and a bottom edge, the main body further having a length, a thickness, and a longitudinal axis;

a plurality of spokes extending radially inward from the main body at an oblique angle relative to the main body;

an annular inner wall coupled to the plurality of angled spokes and surrounding an interior cavity, wherein the annular inner wall extends the length of the main body; and a first annular flange extending radially outwardly from the top edge of the main body and a second annular flange extending radially outwardly from the bottom edge of the main body, wherein the oblique angle that each spoke extends radially inward from the main body is in a range of from about 40 degrees to about 75 degrees.

14. The grommet of claim 13, wherein an inner surface of the annular inner wall comprises a plurality of gripping features.

15. The grommet of claim 13, wherein the main body has a first thickness and the annular inner wall has a second thickness, and wherein the first thickness is greater than the second thickness.

16. The grommet of claim 13, further comprising a slot extending the length of the main body and annular inner wall.

17. The grommet of claim 13, in combination with the cable, wherein the cable resides within the interior cavity of the main body.

18. The grommet of claim 13, in combination with a cable hanger, wherein the cable hanger has opposable arms, and wherein the grommet is held between the opposable arms.

* * * * *